US011532851B2

(12) United States Patent
Park et al.

(10) Patent No.: US 11,532,851 B2
(45) Date of Patent: Dec. 20, 2022

(54) SI-ANODE-BASED SEMI-SOLID CELLS WITH SOLID SEPARATORS

(71) Applicant: ENEVATE CORPORATION, Irvine, CA (US)

(72) Inventors: Benjamin Yong Park, Mission Viejo, CA (US); Liwen Ji, San Diego, CA (US)

(73) Assignee: Enevate Corporation, Irvine, CA (US)

( * ) Notice: Subject to any disclaimer, the term of this patent is extended or adjusted under 35 U.S.C. 154(b) by 154 days.

(21) Appl. No.: 16/678,849

(22) Filed: Nov. 8, 2019

(65) Prior Publication Data
US 2021/0143385 A1 May 13, 2021

(51) Int. Cl.
| H01M 50/446 | (2021.01) |
| H01M 4/134 | (2010.01) |
| H01M 4/133 | (2010.01) |
| H01M 4/505 | (2010.01) |
| H01M 4/525 | (2010.01) |
| H01M 4/131 | (2010.01) |
| H01M 4/137 | (2010.01) |
| H01M 10/0562 | (2010.01) |
| H01M 10/0525 | (2010.01) |
| H01M 4/136 | (2010.01) |
| H01M 4/02 | (2006.01) |

(52) U.S. Cl.
CPC ......... *H01M 50/446* (2021.01); *H01M 4/131* (2013.01); *H01M 4/133* (2013.01); *H01M 4/134* (2013.01); *H01M 4/136* (2013.01); *H01M 4/137* (2013.01); *H01M 4/505* (2013.01); *H01M 4/525* (2013.01); *H01M 10/0525* (2013.01); *H01M 10/0562* (2013.01); *H01M 2004/027* (2013.01); *H01M 2004/028* (2013.01); *H01M 2300/0034* (2013.01); *H01M 2300/0051* (2013.01)

(58) Field of Classification Search
None
See application file for complete search history.

(56) References Cited

U.S. PATENT DOCUMENTS

| 3,969,139 A * | 7/1976 | Lai ........................ H01M 10/36 429/103 |
| 7,070,632 B1 | 7/2006 | Visco et al. |
| 7,960,058 B2 | 6/2011 | Goodenough et al. |
| 8,304,115 B1 * | 11/2012 | Petkov ................ H01M 50/434 429/304 |
| 8,764,966 B2 | 7/2014 | Vajo et al. |
| 8,815,432 B2 * | 8/2014 | Jo .......................... B32B 27/32 428/221 |
| 8,828,574 B2 | 9/2014 | Visco et al. |
| 9,379,368 B2 | 6/2016 | Roumi |
| 9,853,324 B2 | 12/2017 | Chan et al. |
| 2007/0009806 A1 * | 1/2007 | Kim .................. H01M 10/0525 429/329 |
| 2007/0065727 A1 * | 3/2007 | Koike ............... H01M 10/0568 429/326 |
| 2009/0068565 A1 * | 3/2009 | Lee ................... H01M 10/0567 429/333 |
| 2010/0143798 A1 * | 6/2010 | Zhamu .................. H01M 4/133 977/734 |
| 2015/0064520 A1 * | 3/2015 | Christensen ...... H01M 10/0562 429/66 |
| 2016/0211498 A1 | 7/2016 | Kim et al. |
| 2016/0293946 A1 | 10/2016 | Ritter et al. |
| 2016/0351973 A1 | 12/2016 | Albano et al. |
| 2017/0040598 A1 | 2/2017 | Wang et al. |
| 2017/0263975 A1 | 9/2017 | Anandan et al. |
| 2017/0271639 A1 * | 9/2017 | Yoshima ............... H01M 50/20 |
| 2017/0331092 A1 * | 11/2017 | Chen ..................... H01M 4/137 |
| 2018/0026302 A1 * | 1/2018 | Kumar ................ H01M 50/449 429/144 |
| 2018/0191026 A1 * | 7/2018 | Thielen ............. H01M 10/0525 |
| 2019/0044186 A1 * | 2/2019 | Kim ................... H01M 10/058 |
| 2019/0058177 A1 * | 2/2019 | Herle .................. H01M 50/449 |

FOREIGN PATENT DOCUMENTS

CN 109428038 * 3/2019

OTHER PUBLICATIONS

Machine translation of CN 109428038, published on Mar. 5, 2019 (Year: 2019).*
Int'l Search Report and Written Opinion Appln No. PCT/US2020/058246 dated Jul. 22, 2021.
Int'l Preliminary Report on Patentability Appln No. PCT/US2020/058246 dated May 19, 2022.

* cited by examiner

Primary Examiner — Anca Eoff
(74) Attorney, Agent, or Firm — McAndrews Held & Malloy, Ltd.

(57) ABSTRACT

Energy storage devices comprising a solid-state electrolyte/separator are disclosed. The storage device comprises an anode and a cathode, wherein the anode is a Si-dominant electrode, a solid-state separator between the first electrode and the second electrode wherein the separator comprises an inorganic solid-state material. The energy storage devices may also comprise a small amount of standard liquid electrolyte.

10 Claims, 4 Drawing Sheets

SI-ANODE-BASED SEMI-SOLID CELLS WITH SOLID SEPARATORS

BACKGROUND OF THE INVENTION

Field of the Invention

The present application relates generally to electrolytes for energy storage devices. In particular, the present application relates to inorganic solid-state electrolytes for use in lithium (Li)-ion energy storage devices with silicon-based anode materials.

Description of the Related Art

As the demands for both zero-emission electric vehicles and grid-based energy storage systems increase, lower costs, high energy density, high power density, and safety of energy storage devices, such as lithium (Li)-ion batteries, are highly desirable. Improving the energy and power density and the safety of Li-ion batteries requires the development of high-capacity high-voltage cathodes, high-capacity anodes, and accordingly, functional electrolytes with high voltage stability and interfacial compatibility with electrodes.

A Li-ion battery typically includes a separator and/or electrolyte between an anode and a cathode. In one class of the battery, the separator, cathode and anode materials are individually formed into sheets or films. Sheets of the cathode, separator and anode are subsequently stacked or rolled with the separator separating the cathode and the anode (collectively, electrodes) to form a battery. A typical electrode includes electro-chemically active material layer on an electrically conductive metal (e.g., aluminum or copper). Films can be rolled, or cut into pieces which are then layered into stacks. The stack includes alternating electro-chemically active materials with the separator between them.

Most of the commercial Li-ion batteries use graphite anodes, which have encountered their theoretical capacity limits. Therefore, alternative high capacity anode materials are urgently needed. Si has a great potential to boost the energy density of Li-ion batteries because of its high theoretical capacity of 3579 mAh/g at room temperature (corresponding to the formation of $Li_{15}Si_4$) and its ability to alloy/de-alloy Li at a low average potential (<0.4 V vs. $Li^+/Li$). However, achieving stable cycling is a long-term hurdle due to the large volume changes and unstable solid electrolyte interphase (SEI) layer in organic solvent electrolytes. In these liquid electrolytes, volume expansion and extraction of Si powders upon prolonged charge/discharge processes causes repetitive exposure of fresh surface, which results in unlimited formation and thickening of SEI layer. At the same time, the large volume change in Si anodes causes material pulverization, morphology change of the entire Si anode, leading to serious capacity fading. When paired with high-voltage nickel-rich cathodes (such as NMC or NCA), oxidation of the electrolyte and dissolution of transition metal ions also further decrease battery lifetime. To alleviate these issues, a tremendous effort has been put in place to stabilize the interphases between the electrolyte and both Si anodes and NMC (or NCA) cathodes. These may include the reduction of Si particle size to nanometers, utilization of new binders or investigation of new electrolyte additives. While these adopted strategies are somewhat helpful, none of them can really solve the key problems. As a result, the large scale utilization of Si anode-based Li-ion batteries is still limited.

Conventionally, the electrolytes for the general Li-ion batteries (including Si anode-based ones) are organic, aprotic solvent-based liquid ones. In this case, the spewing of hot electrolyte vapors from a cell at high temperatures and voltages presents potential hazards like volatilization, flammability, and explosion. In addition, low charge retention and operational difficulties at low and high temperatures are the other key challenges associated with liquid electrolytes. To address these challenges, solid-state electrolytes may be considered as it eliminates flammable solvents, thereby improving safety along with providing other unique advantages.

SUMMARY OF THE INVENTION

Disclosed herein includes an energy storage device comprising a Si-dominant anode, a cathode comprising a metal oxide, and a separator disposed between the anode and the cathode, wherein the separator comprises an inorganic solid-state material selected from the group consisting of a lithium (Li)-ion superionic conductor (LISICON) ceramics, a sodium superionic conductor (NASICON) ceramics, a garnet-like structural ceramic, an oxide based perovskite-type ceramics, a sulfide based glassy and glass-ceramic, a Li-phosphorous-oxynitride (LiPON) ceramics, a Li-nitride-based material, Li argyrodite, $Li_3PO_4$, a Li halide material, and a Li hydride material. Optionally, the energy storage device may further comprises a liquid electrolyte. Optionally, the separator further comprises a polymeric material.

In some other implementations, the anode may comprise between about 50% and about 96% by weight of Si particles, and greater than 0% to about 50% by weight of one or more types of carbon phases, wherein at least one of the one or more types of carbon phases is a substantially continuous phase that holds the composite material film together such that the silicon particles are distributed throughout the composite material film.

DETAILED DESCRIPTION OF THE PREFERRED EMBODIMENT

Energy Storage Device

Figure 1A:
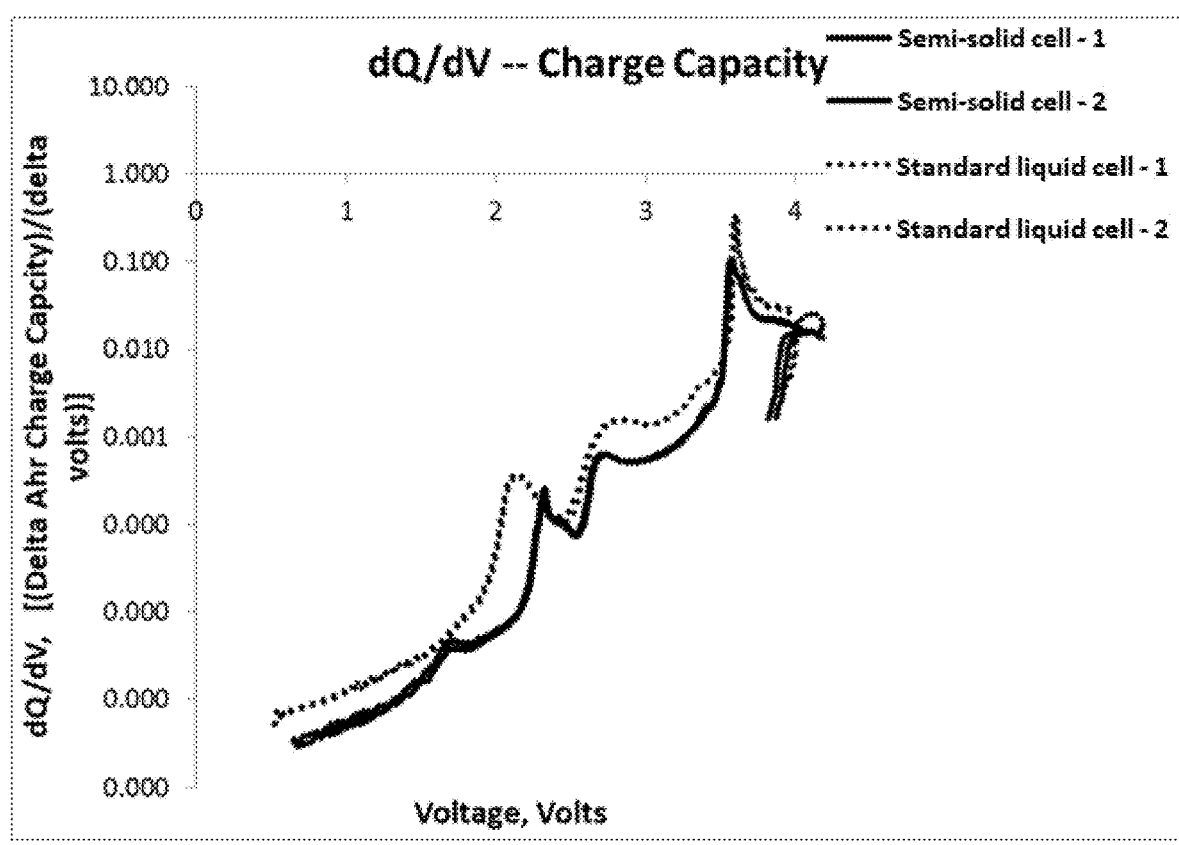
FIGS. 1A and 1B show the dQ/dV curves of an embodiment of Si-dominant anode/NCM-622 cathode semi-solid full cell and an embodiment of standard liquid cell during Charge (A) and Discharge (B) of the cells, respectively.

An energy storage device includes a first electrode, a second electrode, a separator between the first electrode and the second electrode, and an electrolyte in contact with the first electrode, the second electrode, and the separator. The electrolyte serves to facilitate ionic transport between the first electrode and the second electrode. One of the first electrode and the second electrode is an anode (i.e., negative electrode), and the other is a cathode (i.e., positive electrode). In some embodiments, energy storage devices may include batteries, capacitors, and battery-capacitor hybrids.

In some implementations, at least one electrode may be a Si-based electrode. The Si-based electrode may be the anode. In some embodiments, the Si-based anode includes silicon in an amount of about 25% or more of the active material used in the electrode. In some embodiments, the Si-based anode is a Si-dominant anode, where silicon is the majority (e.g., in an amount of about 50% or more) of the active material used in the electrode.

Pairing a Si anode with a high-voltage, high capacity nickel (Ni)-rich cathode, such as a $LiNi_xCo_yMn_zO_2$ (NCM, 0≤x, y, z<1) or $LiNi_xCo_yAl_zO_2$ (NCA, 0≤x, y, z<1), can help further improve the energy density of Li-ion batteries. Therefore, the battery size can be made smaller without reducing the amount of energy storage. This will contribute to more space-saving and increased range per charge for electric vehicles (EVs). However, as the Si in the electrode expands and contracts, it essentially cracks apart and pulverizes. Over time a thick resistive SEI layer can develop on the anode surface, which causes the Si anode to lose both capacity and power (rate capability). At the same time, the dissolution of transition metal ions from NCM or NCA cathode and the loss of $Li^+$ ions also degrade battery performance. For example, the transition metal ions dissolved from the NCM or NCA cathode migrate through the electrolyte solution and deposit on the surface of Si anode. This is where decomposition reactions of solvent molecules and anions are catalyzed, with consumption of $Li^+$ ions, generation of gases, and passivating film thickening, leading to decreased battery power and a shortened cycle life. In addition, the general Li-ion batteries (including Si anode-based ones) use organic solvent-based liquid electrolytes, which suffer from the potential risks like volatilization, flammability, and explosion. Such potential risk can limit the ability of a Li-ion battery to cater to all of different customers and applications. As a result, it is necessary to mitigate lifetime and other performance challenges associated with Si anodes and Ni-rich cathodes, and to adopt intrinsically safe electrolytes to enhance battery safety.

By contrast, the SEI layer does not form in solid electrolytes or is somewhat controlled—it is at least different from fully liquid systems even in semi-solid cells, since only Li ions are mobile and the reactants required for SEI are limited in supply to the Si surface. Furthermore, morphological changes in Si-anode-based solid-state Li-ion batteries are suppressed since Si anodes are confined to a limited space formed between the current collector and solid electrolyte membrane. Thus, an energy storage device without a liquid electrolyte or with a reduced amount of liquid electrolyte may help improve both safety and performance.

Solid-state electrolytes contain materials in the solid form has the potential to have the following advantages: (i) permit higher energy density and power density; (ii) prevent dendrites (small and finger-like projections) formation and avoids short circuits when used in lithium metal systems; (iii) chemical and electrochemical stability within a wider voltage range (>6V) as compared to other types of electrolytes which have a relatively narrow working voltage range; (iv) longer cycle life as compared to limited cycle life for organic liquid ones; (v) safer to use as risks such as spinning, boiling, burning, and gassing do not exist; (vi) wide operating temperatures ranging from −40° C. to 150° C. compared to liquid electrolytes that also possess a relatively narrow one.

Disclosed herein is an energy storage device that includes an anode, a cathode, a separator disposed between the anode and the cathode. The separator as described herein may be a solid, and may serve as a solid electrolyte in the energy storage device. Optionally, the energy storage device may further include a liquid electrolyte. The anode can be a Si-based anode, and in some implementations, the anode may be a Si-dominant anode. The cathode may include a metal oxide described herein.

Separator/Electrolyte

Inorganic solid-state electrolytes do not combust, leak, corrode or cause internal shorting like the organic liquid ones. The inorganic solid-state electrolytes are more chemically stable or could even be inert toward Si anode and cathodes such as high-voltage Ni-rich NCM or NCA cathode and act as a separator at the same time. Other important functional properties include high thermal stability during charge and discharge, wide electrochemical stability window against irreversible reaction, and high total Li ionic conductivity. This may not only solve the safety issue, but could also provide several other significant advantages, such as greater energy storage ability (if the solid electrolyte layer is able to be made thin), no dendrite formation (tiny, fingerlike metallic projections called dendrites that can grow through the electrolyte layer and lead to short-circuits)—in cases where lithium plating could occur, and exceptionally long cycle life. Since the solid-state electrolyte acts as a separator in the energy storage device described herein, the term "separator" is used to include the structure that provides both separator function and electrolyte function.

The separator may include an inorganic solid-state material. For example, the inorganic solid-state materials may be selected from a lithium (Li)-ion superionic conductor (LISICON) ceramics, a sodium superionic conductor (NASICON) ceramics, a garnet-like structural ceramic, an oxide based perovskite-type ceramics, a sulfide based glassy and glass-ceramic, a Li-phosphorous-oxynitride (LiPON) ceramics, a Li-nitride-based material, Li argyrodite, $Li_3PO_4$, a Li halide material, and a Li hydride material.

Examples of LISICON ceramics includes $Li_{1+x+3z}Al_x(Ti, Ge)_{2-x}Si_{3z}P_{3-z}O_{12}$ (LAGP), $Li_{1+x}Al_xTi_{2-x}(PO4)_3$, $Li_{14}Zn(GeO_4)_4$, $Li_4GeO_4$—$Zn_2GeO_4$, $LiSiO_4$-$\gamma Li_3PO_4$, $Li_{3.25}P_{0.75}Ge_{0.25}S_4$, $Li_{10}SnP_2S_{12}$, $Li_{10}GeP_2S_{12}$, $Li_{9.54}Si_{1.74}P_{1.44}S_{11.7}Cl_{O3}$, and $Li_{3.833}Sn_{0.833}As_{0.166}S_4$. Examples of NASICON ceramics include $Li_{1+x}Zr_2P_{3-x}Si_xO_{12}$, $Li_{1+x}Al_xTi_{2-x}(PO_4)_3$, $LiTi_2(PO_4)_3$, $LiGe_2(PO_4)_3$, $LiHf_2(PO_4)_3$, $LiZr_2(PO_4)_3$. Examples of garnet-like structural ceramics include $Li_5La_3Ta_2O_{12}$, $Li_7La_3Zr_2O_{12}$, $Li_{6.4}La_3Zr_{1.4}Ta_{0.6}O_{12}$ (Ta-doped LLZO), $Li_{7-3x}Al_xLa_3Zr_2O_{12}$(Al-doped LLZO), $Li_{6.5}La_3Zr_{15}Nb_{0.5}O_{12}$ (Nb-doped LLZO), $Li_{5.5}La_3Nb_{1.75}In_{0.25}O_{12}$, $Li_6BaLa_2Ta_2O_{12}$, $Li_{6.5}La_3Nb_{1.25}Y_{0.75}O_{12}$, $Li_{6.24}La_3Zr_2Al_{0.24}O_{11.98}$, and $Li_{6.24}La_3Zr_2Ga_{0.24}O_{11.98}$. Examples of oxide-based perovskite-type ceramics include $Li_{0.5-3x}La_{0.5+x}TiO_3$ (LLTO), Al-doped LLTO Al-doped LLTO, Ti-doped LLTO, and Ag-doped LLTO. Examples of sulfide based glassy and glass-ceramic includes $Li_2S$—$GeS_2$, $Li_2S$—$P_2S_5$, $Li_2S$—$B_2S_3$, $Li_2S$—$SiS_2$, and $Li_{10}MP_2S_{12}$, wherein M is Si, Ge, or Sn. Examples of Li-nitride-based material include $Li_3N$, $Li_7PN_4$, $LiSi_2N_3$, and $LiPN_2$. Examples of Li argyrodite include $Li_6PS_5Br$, $Li_6PS_5Cl$, $Li_7PS_6$, $Li_6PS_5I$, and $Li_6PO_5Cl$. Examples of Li halide material include $Li_2CdI_4$, $Li_2CdCl_4$, $Li_2MgCl_4$, and $LiZnI_4$. Examples of Li hydride material include $Li_2NH$, $LiBH_4$, $LiAlH_4$, and $LiNH_2$.

In some implementations, the separator may further include a polymeric material. Therefore, the separator may include a polymer/inorganic ceramic composite material. Examples of polymers that can be included in the separator include polyethylene oxide (PEO), poly(vinylidene fluoride-co-hexafluoropropylene) (PVDF-HFP), polyacrylonitrile (PAN), poly(methyl methacrylate) (PMMA), polycarbonate, polysiloxane, polyvinyl chloride (PVC), hydroxy-terminated perfluoropolyether (PFPE-diol), etc. The separator described herein can also function as a solid electrolyte.

In addition to the separator/solid electrolyte described above, the energy storage device may also further include a small amount of liquid electrolyte. For example, the amount of liquid electrolyte may be about 5% to about 35%, about 10% to about 30%, about 15% to about 30%, about 20% to about 30%, about 15% to about 25%, or about 10% to about 20% of the solid electrolyte. The liquid electrolyte may include at least a solvent and a Li ion source, such as a Li-containing salt. In some embodiments, the Li-containing salt may comprise lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium difluoro(oxalate)borate (LiDFOB), lithium bis(oxalato)borate (LiBOB), and lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), etc.

The electrolyte may include additional component(s) such as a cyclic carbonate and/or a linear carbonate. In some implementations, the cyclic carbonate is a fluorine containing cyclic carbonate. Examples of the cyclic carbonate include fluoroethylene carbonate (FEC), di-fluoroethylene carbonate (DiFEC), trifluoropropylene carbonate (TFPC), ethylene carbonate (EC), vinyl carbonate (VC), and propylene carbonate (PC), 4-fluoromethyl-5-methyl-1,3-dioxolan-2-one (F-t-BC), 3,3-difluoropropylene carbonate (DFPC), 3,3,4,4,5,5,6,6,6-Nonafluorohexyl-1-ene carbonate, etc. Examples of the linear carbonate include ethyl methyl carbonate (EMC), dimethyl carbonate (DMC), and diethyl carbonate (DEC), and some partially or fully fluorinated ones. In some implementations, the electrolyte may further contain other co-solvent(s), such as methyl acetate (MA), ethyl acetate (EA), methyl propanoate, and gamma butyrolactone (GBL). The cyclic carbonates may be beneficial for SEI layer formations, while the linear carbonates may be helpful for dissolving Li-containing salt and for Li-ion transport.

One of the additional components may include a fluorine-containing compound, such as a fluorine-containing cyclic carbonate, a fluorine-containing linear carbonate, and/or a fluoroether. Examples of fluorine-containing compound may include FEC, DiFEC, TFPC, 1,1,2,2-tetrafluoroethyl 2,2,3,3-tetrafluoropropyl ether, and other partially or fully fluorinated linear or cyclic carbonates and ethers, etc. In some embodiments, the electrolyte contains FEC. In some embodiments, the electrolyte contains both EMC and FEC. In some embodiments, the electrolyte is free or substantially free of non-fluorine-containing cyclic carbonates, such as EC, VC, and PC.

An example of the liquid electrolyte includes $LiPF_6$ in FEC/EMC. The concentration of $LiPF_6$ may be from about 0.5 to about 1.8 M, or any number within this range. The amount of FEC may be between about 1% and about 10% by weight, or any number within the range. The amount of EMC may be between about 1% and about 10% by weight, or any number within the range.

Anode

The anode for the energy storage device include Si-based anode. Several types of silicon materials, e.g., silicon nanopowders, silicon nanofibers, porous silicon, and ball-milled silicon, are viable candidates as active materials for the anode. Alternatively, as described in U.S. patent application Ser. No. 13/008,800 and Ser. No. 13/601,976, entitled "Composite Materials for Electrochemical Storage" and "Silicon Particles for Battery Electrodes," a Si-based anode can also contain a composite material film that includes Si particles distributed in a carbon phase. The Si-based anode can include one or more types of carbon phases. At least one of these carbon phases is a substantially continuous phase that extends across the entire film and holds the composite material film together. The Si particles are distributed throughout the composite material film.

The composite material film may be formed by pyrolyzing a mixture comprising a precursor (such as a polymer or a polymer precursor) and Si particles. The mixture can optionally further contain graphite particles. Pyrolyzation of the precursor results in one or more type of carbon phases. In some implementations, the composite material film can have a self-supporting monolithic structure, and therefore is a self-supporting composite material film. Because the precursor is converted into an electrically conductive and electrochemically active matrix, the resulting electrode is conductive enough that, in some cases, a metal foil or mesh current collector can be omitted or minimized. The converted polymer also acts as an expansion buffer for Si particles during cycling so that a high cycle life can be achieved. In certain implementations, the resulting electrode is an electrode that is comprised substantially of active material. The electrodes can have a high energy density of between about 500 mAh/g to about 1200 mAh/g. The composite material film may also be used as a cathode active material in some electrochemical couples with additional additives.

The amount of carbon obtained from the precursor can be from about 2% to about 50%, from about 2% to about 40%, from about 2% to about 30%, from about 2% to about 25%, or from about 2% to about 20% by weight of the composite material. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon. Possible hard carbon precursors can include polyimide (or a polyimide precursor), phenolic resins, epoxy resins, and other polymers that have a very high melting point or are crosslinked.

The amount of Si particles in the composite material may be between greater than 0% and about 99% by weight, between about 20% and about 80%, between about 30% and about 80%, or between about 40% and about 80%. In some implementations, the amount of Si particles in the composite material may be between about 50% and about 99% by weight, between about 50% and about 96%, between about 60% and about 90%, between about 70% and about 99%; between about 50% and about 80%, or between about 50% and about 70%, or greater than about 50%, and such anode is considered as a Si-dominant anode. The amount of one or more types of carbon phases in the composite material may be between greater than 0% and about 90% by weight, between greater than 0% and about 50%, between about 1% and about 50%, between about 1% and about 60%, or between about 1% and about 70% by weight. The pyrolyzed/carbonized polymer can form a substantially continuous conductive carbon phase in the entire electrode as opposed to particulate carbon suspended in a non-conductive binder in one class of conventional lithium-ion battery electrodes.

The largest dimension of the silicon particles can be less than about 40 m, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. Furthermore, the silicon particles may or may not be pure silicon. For example, the silicon particles may be substantially silicon or may be a silicon alloy. The silicon alloy includes silicon as the primary constituent along with one or more other elements.

Micron-sized silicon particles can provide good volumetric and gravimetric energy density combined with good cycle life. In certain implementations, to obtain the benefits of both micron-sized silicon particles (e.g., high energy density) and nanometer-sized silicon particles (e.g., good cycle behavior), silicon particles can have an average particle size in the micron range and a surface including nanometer-sized features. The silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

Optionally, conductive particles that may also be electrochemically active are added to the mixture. Such particles can enable both a more electronically conductive composite as well as a more mechanically deformable composite capable of absorbing the large volumetric change incurred during lithiation and de-lithiation. A largest dimension of the conductive particles is between about 10 nanometers and about 100 microns. All, substantially all, or at least some of the conductive particles may comprise the largest dimension described herein. In some implementations, an average or median largest dimension of the conductive particles is between about 10 nm and about 100 microns. The mixture may include greater than 0% and up to about 80% by weight conductive particles. The composite material may include about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys, such as copper, nickel, or stainless steel.

For example, graphite particles can be added to the mixture. Graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. Preferably, a largest dimension of the graphite particles is between about 0.5 microns and about 100 microns. All, substantially all, or at least some of the graphite particles may comprise the largest dimension described herein. In some implementations, an average or median largest dimension of the graphite particles is between about 0.5 microns and about 100 microns. The mixture may include about 2% to about 50% by weight of graphite particles. The composite material may include about 40% to about 75% by weight graphite particles.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during use of the battery to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

Cathode

The cathode for the energy storage device may include metal oxide cathode materials, such as Lithium Cobalt Oxide ($LiCoO_2$) (LCO), lithium (Li)-rich oxides/layer oxides, nickel (Ni)-rich oxide/layered oxides, high-voltage spinel oxides, and high-voltage polyanionic compounds. Ni-rich oxides/layered oxides may include lithium nickel cobalt manganese oxide ($LiNi_xCo_yMn_zO_2$, $x+y+z=1$, "NCM"), lithium nickel cobalt aluminum oxide ($LiNi_aCo_bAl_cO_2$, $a+b+c=1$, "NCA"), $LiNi_{1-x}M_xO_2$ and $LiNi_{1+x}M_{1-x}O_2$ (where M=Co, Mn or Al). Examples of a NCM material include $LiNi_{0.6}Co_{0.2}Mn_{0.2}O_2$ (NCM-622), NCM-111, NC-433, NCM-523, NCM-811, and NCM-9 0.5 0.5. Li-rich oxides/layered oxides may include $Li_yNi_{1+x}M_{1-x}O_2$ (where y>1, and M=Co, Mn or Ni), $xLi_2MnO_3 \cdot (1-x)LiNi_aCo_bMn_cO_2$, and $xLi_2Mn_3O_2(1-x)LiNi_aCo_bMn_cO_2$. High-voltage spinel oxides may include lithium manganese spinel ($LiMn_2O_4$, "LMO") or lithium nickel manganese spinel ($LiNi_{0.5}Mn_{1.5}O_4$, "LNMO"). High-voltage polyanionic compounds may include phosphates, sulfates, silicates, titanate, etc. One example of polyanionic compound may be lithium iron phosphate (LiFePO$_4$, "LFP").

Advantages

One key point for the novel energy storage device design described herein is that the high-energy-density high-loading anode wouldn't shatter the solid electrolyte by expanding too much. Other silicon particles will expand between 100-300%, but the silicon film anode or other silicon-dominant anodes can reduce expansion by creating a composite layer that is very strongly adhered to copper, which allows the Si anodes to swell only ~0-3% in many cases which can be handled by some solid electrolytes. The unique design could at least bring the following benefits:

(i) High energy density—other researcher who use silicon anodes with solid-state electrolyte typically only can match with ultra-thin films (nano scale thickness) of silicon as those films are stable in the x-y dimensions. The electrodes described herein have much higher loading (~100 times or higher, 11 mAh/cm$^2$ total capacity and ~4 mAh/cm$^2$ cycled capacity for each side compared to thin film Si anode which is ~0.8 mAh/cm$^2$ even in the thickest Si thin film. The silicon anode can be matched with both organic or inorganic solid state electrolytes.

(ii) Huge safety benefits—solid-state separators matched with a low-expansion silicon electrode and liquid electrolyte has the following benefits as long as the solid-state separator is inorganic and, even more beneficially, is non-porous or has lower porosity vs typical separators. Organic solid electrolyte could also benefit the safety performance, but with a lesser extent compared to inorganic solid-state electrolytes if the solid electrolyte is combustible. Most organic solid electrolytes (polymer electrolytes) are still much less flammable/combustible compared to liquid electrolytes: (a) the cathode and anode have much less likelihood of shorting as the separator is solid; (b) when the cathode gives off oxygen due to thermal runaway or some other condition, it is more difficult for the oxygen to cross over to the anode side, thus somewhat limiting the reaction; and (c) in many cases, the electrolyte is the largest source of flammable material in a cell—using this invention, the electrolyte can be reduced by 50% or more.

(iii) High FEC content in the standard liquid electrolytes—other papers have discussed high amounts of FEC being detrimental to cell performance. Using high FEC (≥30 wt %) does not cause detriments to performance while helping the low-expansion Si anode cycle. This is a unique property tied to the specific design and components used in the design of the cell.

EXAMPLES

The performances of Li-ion semi-solid and liquid cells were evaluated.

Example 1

Semi-solid cell: A Si-dominant anode/NCM-622 cathode full cell with a solid-state separator was prepared. The solid-state separator was LISICON membrane based with a thickness of about 300 µm. A small amount of standard electrolyte, 1.2 M LiPF$_6$ in FEC/EMC (3/7 wt %), 150 µl, was added to the full cell. The active material of the Si-dominant anode contains about 80 wt % of Si, about 5 wt % of graphite, and about 15 wt % of glassy carbon (from resin). The active material was laminated on a 15 µm Cu foil. The average loading for the anode is about 3.8 mg/cm$^2$. The cathode active material contains about 92 wt % of NCM-622, about 4 wt % of Super P and about 4 wt % of PVDF5130, and was coated on 15 µm of Al foil. The average loading of the cathode is about 23 mg/cm$^2$.

Liquid cell: A Si-dominant anode/NCM-622 cathode full cell with liquid electrolyte was also prepared using the same types of anode and cathode. Instead of a solid-state separator, the liquid electrolyte cell contains 300 µl of 1.2 M LiPF$_6$ in FEC/EMC (3/7 wt %) and a standard separator. The standard separator does not include an inorganic solid-state material.

Figure 1B:
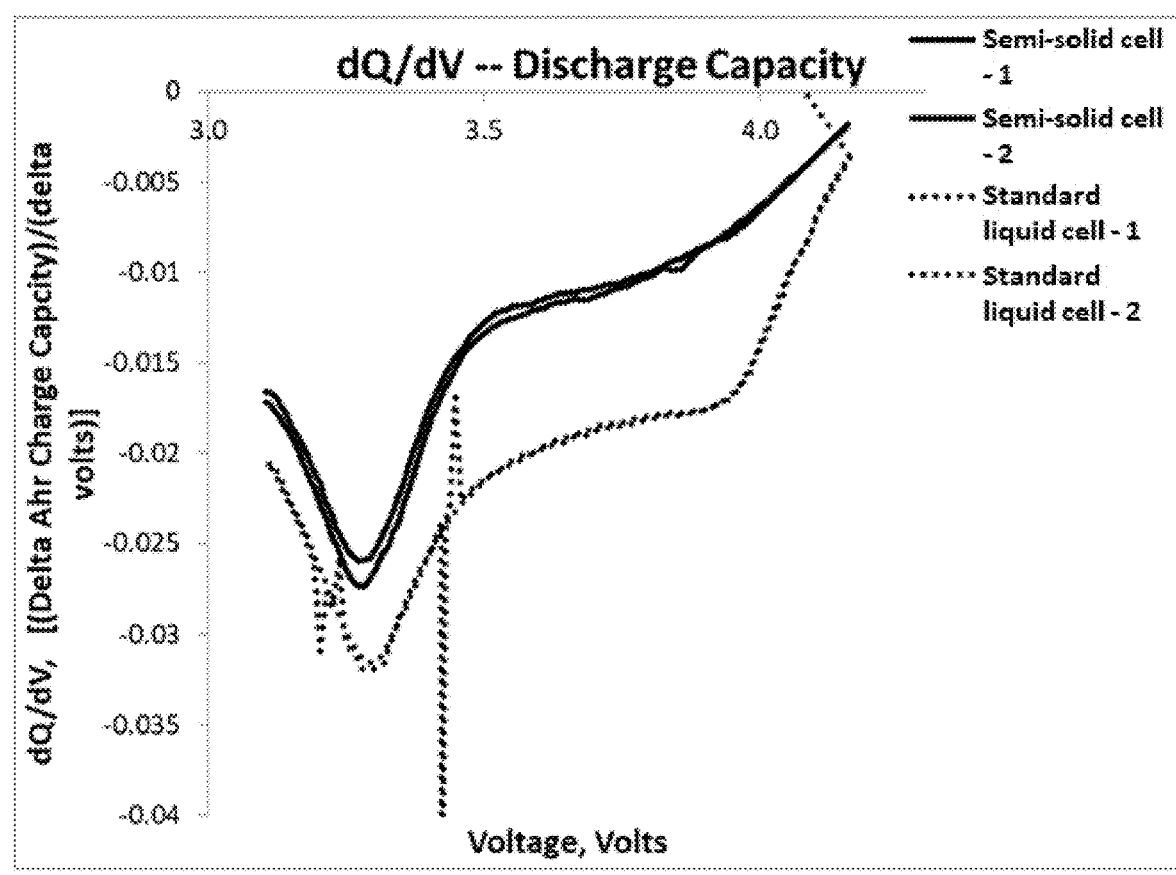

The dQ/dV data were obtained through the following testing protocol: charged at 0.05 C to 4.2 V, rested 5 minutes, then discharged at 0.05 C to 3.1 V, and rested 5 minutes. The dQ/dV plot during charge is shown in FIG. 1A, and the plot during discharge is shown in FIG. 1B. The dotted line shows the data for the liquid cell, while the solid line shows the data for the semi-solid cell. The 1$^{st}$ formation cycle dQ/dV curves in FIGS. 1A and 1B indicate that the fundamental electrochemistry of the lithiation and delithiation of the Si-dominant anode/NCM-622 cathode full cell is not affected by making it a semi-solid cell.

Example 2

Figure 2A:
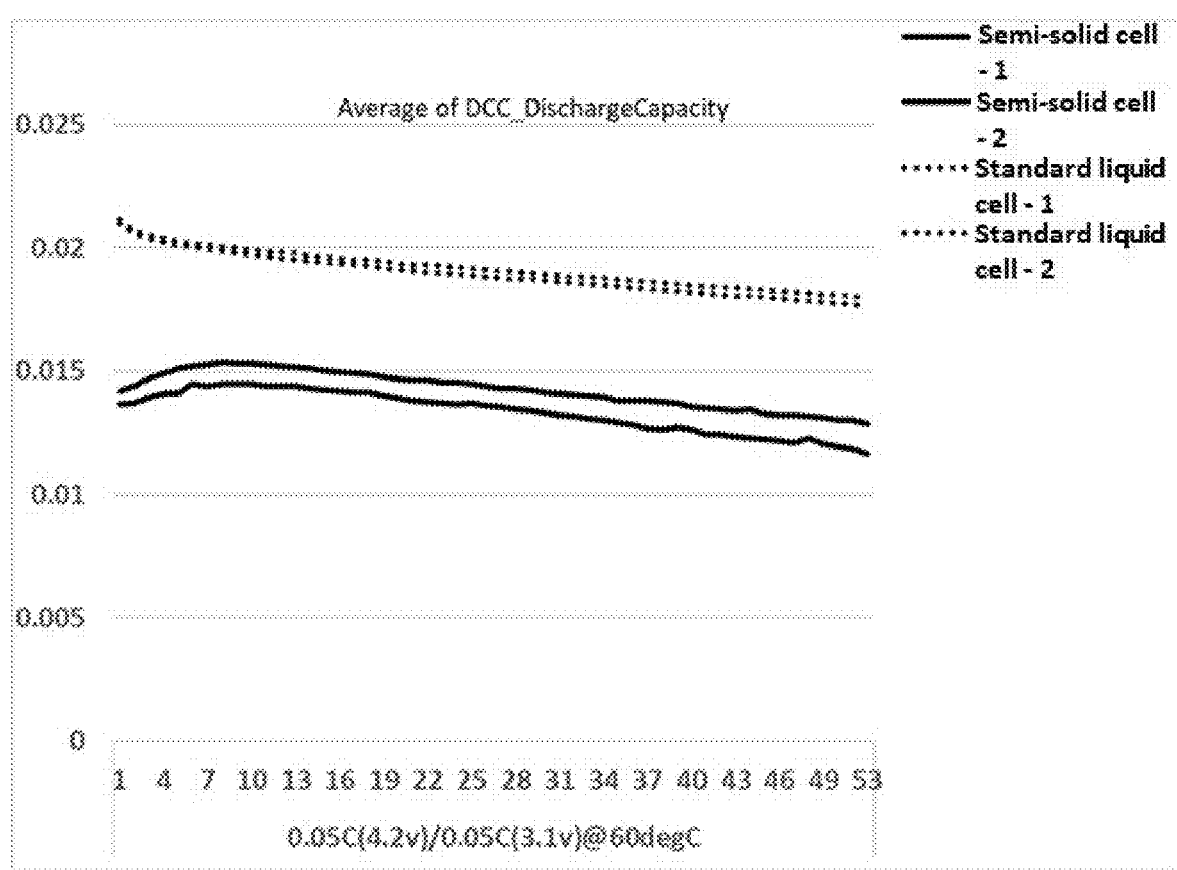
FIGS. 2A and 2B show capacity retention (A) and normalized capacity retention (B), respectively, of an embodiment of Si-dominant anode/NCM-622 cathode semi-solid full cell and an embodiment of standard liquid cell.
Figure 2B:
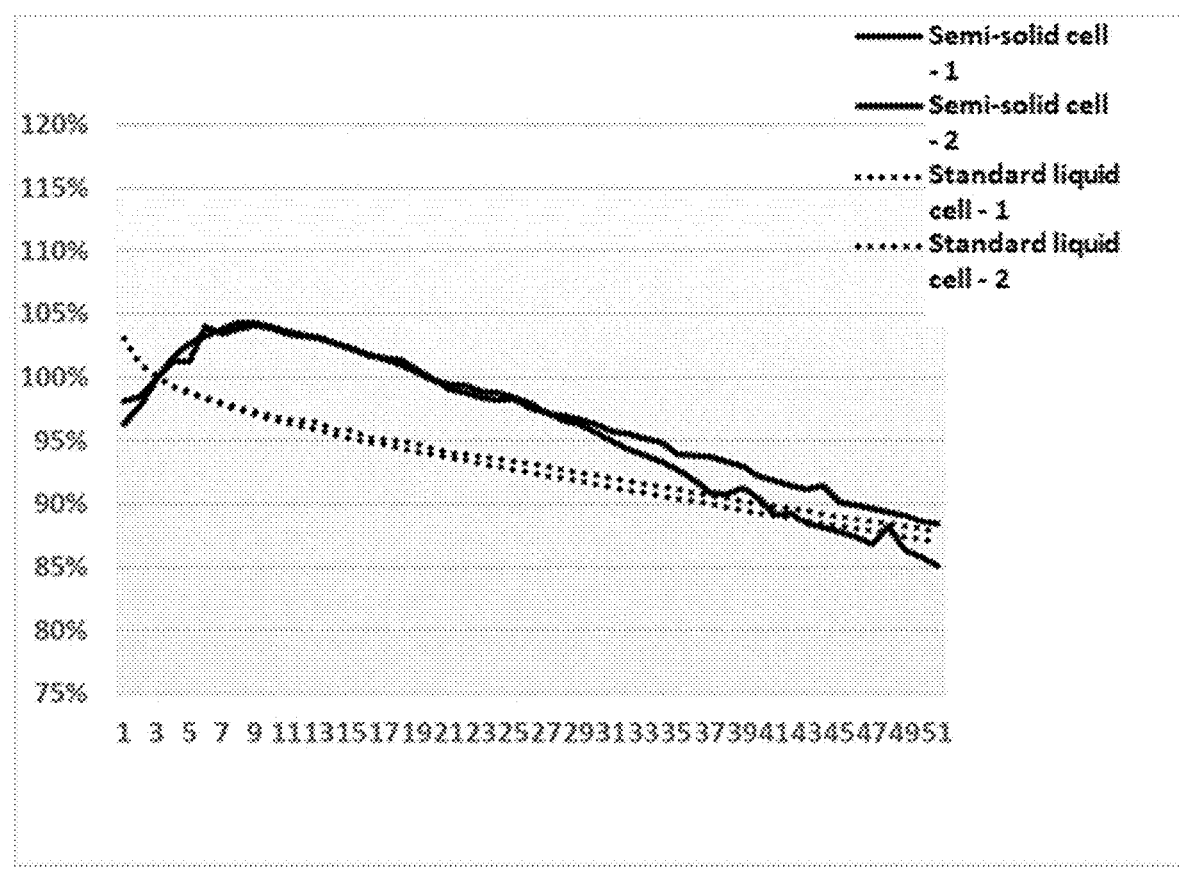

The capacity retention of each of the semi-solid cell and the liquid cell as described in Example 1 was measured through the same charging/discharging protocol: charged at 0.05 C to 4.2 V, rested 5 minutes, then discharged at 0.05 C to 3.1 V, and rested 5 minutes. FIG. 2A shows the capacity retention of each of the liquid cell (dotted line) and the semi-solid cell (solid line). The liquid cell was a two-layer pouch cell, while the semi-solid cell was a single-layer pouch cell. Thus the capacity retention data were normalized and plotted in FIG. 2B. The figures indicate that the Si-dominant anode/NCM-622 cathode full cell with a solid-state separator has a relatively stable cycle performance even after about 20 cycles. The lower capacity at the final cycle does not indicate failure. The test is still ongoing. In comparison, the liquid cell has a lower capacity and worse capacity retention.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An energy storage device comprising:
a Si-dominant anode comprising greater than about 50% by weight of Si particles and between 5% and 50% by weight of one or more types of a carbon phases;
a cathode comprising a metal oxide; and
a separator disposed between the anode and the cathode, wherein the separator comprises:
an inorganic solid-state Li halide material comprising one of Li$_2$CdI$_4$, Li$_2$CdCl$_4$, Li$_2$MgCl$_4$, and LiZnI$_4$; and
a polymeric material selected from a group consisting of polyethylene oxide (PEO), poly(vinylidene fluoride-co-hexafluoropropylene) (PVDF-HFP), polyacrylonitrile (PAN), poly(methyl methacrylate)

(PMMA), polycarbonate, polysiloxane, Polyvinyl chloride (PVC), and hydroxy-terminated perfluoropolyether (PFPE-diol).

2. The energy storage device of claim 1, wherein the energy storage device further comprises a liquid electrolyte.

3. The energy storage device of claim 2, wherein the liquid electrolyte comprises a cyclic carbonate or a linear carbonate, wherein the cyclic carbonate is an ethylene carbonate (EC), vinyl carbonate (VC), and propylene carbonate (PC), or a fluorine containing cyclic carbonate including one or more of fluoroethylene carbonate (FEC), di-fluoroethylene carbonate (DiFEC), trifluoropropylene carbonate (TFPC), 4-fluoromethyl-5-methyl-1,3-dioxolan-2-one (F-t-BC), 3,3-difluoropropylene carbonate (DFPC), or 3,3,4,4,5,5,6,6-Nonafluorohexyl-1-ene carbonate, and wherein the linear carbonate includes one or more of ethyl methyl carbonate (EMC), dimethyl carbonate (DMC), diethyl carbonate (DEC), and some partially or fully fluorinated linear carbonates.

4. The energy storage device of claim 3, wherein the liquid electrolyte comprises FEC and EMC.

5. The energy storage device of claim 3, wherein the liquid electrolyte further comprises one or more co-solvent(s), such as methyl acetate (MA), ethyl acetate (EA), methyl propanoate, or gamma butyrolactone (GBL).

6. The energy storage device of claim 1, wherein the metal oxide is selected from the group consisting of $LiCoO_2$, $LiMn_2O_4$ (LMO), $LiNi_xCo_yMn_zO_2$ (NCM, 0≤x, y, z<1) or $LiNi_xCo_yAl_zO_2$ (NCA, 0≤x, y, z<1), lithium rich $xLi_2MnO_3 \cdot (1-x)LiMO_2$, nickel-rich layered oxides, lithium-rich layered oxides, high-voltage spinel oxides, and high-voltage polyanionic compounds; wherein x is greater than 0 and less than 1; and M is Mn, Ni, or Co.

7. The energy storage device of claim 6, wherein the high-voltage spinel oxide comprises $LiNi_{0.5}Mn_{1.5}O_4$.

8. The energy storage device of claim 6, wherein the high-voltage polyanionic compound comprises phosphates, sulfates, or silicates.

9. The energy storage device of claim 1, wherein the anode comprises:
   between about 50% and about 96% by weight of Si particles, and
   wherein at least one of the one or more types of carbon phases is a substantially continuous phase that holds a composite material film together such that the silicon particles are distributed throughout the composite material film.

10. An energy storage device comprising:
   a Si-dominant anode comprising greater than about 50% by weight of Si particles and between 5% and 50% by weight of one or more types of a carbon phases;
   a cathode comprising a metal oxide;
   a separator disposed between the anode and the cathode, wherein the separator comprises:
      an inorganic solid-state Li halide material comprising one of $Li_2CdI_4$, $Li_2CdCl_4$, $Li_2MgCl_4$, and $LiZnI_4$; and
      a polymeric material selected from a group consisting of polyethylene oxide (PEO), poly(vinylidene fluoride-co-hexafluoropropylene) (PVDF-HFP), polyacrylonitrile (PAN), poly(methyl methacrylate) (PMMA), polycarbonate, polysiloxane, Polyvinyl chloride (PVC), and hydroxy-terminated perfluoropolyether (PFPE-diol); and
   a liquid electrolyte comprising fluoroethylene carbonate (FEC) at a concentration of about 5% to about 35% by weight.

\* \* \* \* \*